United States Patent
Moreu Alonso et al.

(10) Patent No.: US 10,641,898 B1
(45) Date of Patent: May 5, 2020

(54) STRUCTURAL DISPLACEMENT MEASUREMENT USING UNMANNED AERIAL VEHICLES EQUIPPED WITH LASERS

(71) Applicant: STC.UNM, Albuquerque, NM (US)

(72) Inventors: Fernando Moreu Alonso, Albuquerque, NM (US); Mahmoud Reda Taha, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 4 days.

(21) Appl. No.: 15/477,775

(22) Filed: Apr. 3, 2017

Related U.S. Application Data

(60) Provisional application No. 62/317,472, filed on Apr. 1, 2016.

(51) Int. Cl.
*G08G 5/00* (2006.01)
*G01S 13/86* (2006.01)
*G01S 17/50* (2006.01)
*G01S 17/58* (2006.01)

(52) U.S. Cl.
CPC ............ *G01S 17/50* (2013.01); *G01S 13/865* (2013.01); *G01S 17/58* (2013.01); *B64C 2201/123* (2013.01); *G08G 5/0086* (2013.01)

(58) Field of Classification Search
CPC ........ G01S 17/50; G01S 13/865; G01S 17/58; G08G 5/0086; B64C 2201/123
See application file for complete search history.

(56) References Cited

U.S. PATENT DOCUMENTS

| | | | |
|---|---|---|---|
| 9,562,870 B2* | 2/2017 | Bouteyre et al. | ....... F03D 1/065 |
| 9,823,664 B2* | 11/2017 | Krogh et al. | ..... B64C 2201/123 |
| 9,898,821 B2* | 2/2018 | Metzler et al. | ... B64C 2201/123 |
| 2018/0120196 A1* | 5/2018 | Georgeson et al. | ......................... B64C 2201/123 |

OTHER PUBLICATIONS

Kim, R. E., & Spencer Jr, B. F., "Modeling and Monitoring of the Dynamic Response of Railroad Bridges using Wireless Smart Sensors," Newmark Structural Engineering Laboratory, University of Illinois at Urbana-Champaign (2015).
Sweeney, R.A.P., and Unsworth, J.F., "North American Railway Bridge Inspection Practice," TRB Annual Meeting, paper No. 08-0939 (2008).
Sweeney, Robert A. P., and Unsworth, John F., "Bridge Inspection Practice: Two Different North American Railways," Journal of Bridge Engineering, ASCE, vol. 15, Issue 4, pp. 439-444 (2010).
Moreu, F., Jo, H., Li, J., Kim, R., Cho, S., Kimmle, A., Scola, S., Le, H., Spencer, B., Jr., and LaFave, J., "Dynamic Assessment of Timber Railroad Bridges Using Displacements," J. Bridge Eng. (2014).

(Continued)

*Primary Examiner* — Dale W Hilgendorf
(74) *Attorney, Agent, or Firm* — Keith Vogt, Ltd.; Keith A. Vogt

(57) ABSTRACT

An unmanned aerial vehicle (UAV) and laser generator may be used to measure structural displacements. The system may measure relative movement of the UAV and the structure, as well as individual movement of the UAV. The individual movement of the UAV may then be subtracted from the relative movement of the UAV and the structure, in order to accurately calculate structural displacements.

20 Claims, 3 Drawing Sheets

(56) References Cited

OTHER PUBLICATIONS

Lorieux, L., "Analysis of train-induced vibrations on a single-span composite bridge," Department of Civil and Architectural Engineering, Division of Structural Design and Bridges, Royal Institute of Technology (KTH), Stockholm, Sweden (2008).

Miyashita, T., Ishii, H., Fujino, Y., Shoji, A., & Seki, M., "Clarification of the effect of high-speed train induced vibrations on a railway steel box girder bridge using laser Doppler vibrometer," Proc. International Conference on Experimental Vibration Analysis for Civil Engineering Structures (pp. 349-357) (2005).

Moreu, F. and LaFave, J., "Current Research Topics: Railroad Bridges and Structural Engineering"; Newmark Structural Engineering Laboratory (NSEL) Report Series 032; University of Illinois at Urbana-Champaign (UIUC), Urbana, IL (2012).

Lee, H. S., Hong, Y. H. and Park, H. W., "Design of an FIR filter for the displacement reconstruction using measured acceleration in low-frequency dominant structures," Int. J. Numer. Meth. Engng., 82: 403-434 (2010).

Park, K. T., Kim, S. H., Park, H. S., & Lee, K. W, "The determination of bridge displacement using measured acceleration," Engineering Structures, 27(3), 371-378 (2005).

Nakamura, S. I., "GPS measurement of wind-induced suspension bridge girder displacements," Journal of Structural Engineering, 126(12), 1413-1419 (2000).

Lee, J. J., & Shinozuka, M., "A vision-based system for remote sensing of bridge displacement," Ndt & E International, 39(5), 425-431 (2006).

Moreu, F.; Jo, H.; Li, J.; Kim, R.E.; Scola, S.; Spencer, Jr., B. F.; and LaFave, J. M., "Reference-Free Displacements for Condition Assessment of Timber Railroad Bridges", ASCE Journal of Bridge Engineering (2015).

Moreu, F., & Spencer Jr, B. F., "Framework for Consequence-based Management and Safety of Railroad Bridge Infrastructure Using Wireless Smart Sensors (WSS)," Newmark Structural Engineering Laboratory, University of Illinois at Urbana Champaign (2015).

West, Gretchen, "Drone on, The Sky's the Limit—If the FAA Will Get Out of the way," (2015).

Spencer Jr, B. F., Moreu, F., & Kim, R. E, "Campaign Monitoring of Railroad Bridges in High-Speed Rail Shared Corridors using Wireless Smart Sensors," Newmark Structural Engineering Laboratory, University of Illinois at Urbana-Champaign (2015).

Yoon, H., Elanwar, H., Choi, H., Golparvar—Fard, M. and Spencer, B.F., "Target-free approach for vision-based structural system identification using consumer-grade cameras," Structural Control and Health Monitoring (2016).

Yoon, H. and Spencer, B.F., "Enabling Smart City Resilience: Post-disaster Response and Structural Health Monitoring," Newmark Structural Engineering Laboratory, University of Illinois at Urbana-Champaign (2016).

American Railway Engineering and Maintenance-of-Way Association (AREMA), "AREMA bridge inspection handbook TOC," Lanham, MD (2008).

Lee, J. J., Fukuda, Y., Shinozuka, M., Cho, S., & Yun, C. B., "Abstract, Development and application of a vision-based displacement measurement system for structural health monitoring of civil structures," Smart Structures and Systems, 3(3), 373-384 (2007).

Northwestern University Transportation Center, "Technical Workshop: Unmanned Aerial Vehicles: Applications and Emergent Technologies," (2015).

Moreu, F.; Kim, R.R.; Lei, S., Diaz-Fafias, G., Dai, F., Cho, S., Spencer, Jr., B. F., "Absract: Campaign monitoring railroad bridges using wireless smart sensors networks"; Engineering Mechanics Institute (EMI) Conference, ASCE (2014).

\* cited by examiner

STRUCTURAL DISPLACEMENT MEASUREMENT USING UNMANNED AERIAL VEHICLES EQUIPPED WITH LASERS

CROSS REFERENCE TO RELATED APPLICATIONS

Priority is claimed to U.S. Provisional Application No. 62/317,472, filed on Apr. 1, 2016, entitled "BRIDGE NETWORK MONITORING USING UNMANNED AERIAL VEHICLES AND 3D LASERS," which is incorporated by reference in its entirety.

BACKGROUND

Railroad bridges are example structures which are necessary to monitor through occasional displacement measurements. There are presently about 140,000 miles of rail track across the United States. On average, there is presently one bridge for about every 1.4 miles of track. A bridge that is not performing adequately can result in train derailment, posing a very serious hazard to life and property. Furthermore, inadequately performing bridges can slow the advisable speed of trains, which reduces rail network capacity and increases rail delivery times.

Railroads maintain the quality of their bridges to guarantee the reliability and safety of their operations. Railroad bridge managers may inspect bridges annually. Bridge condition decay can be related to bridge displacements under train loads. If railroad bridge inspectors report large bridge displacements, railroad managers will limit the speed of trains crossing them to reduce these displacements and to avoid unsafe operations.

In general, railroad bridge managers currently observe bridge vibrations under trains visually, and estimate displacements qualitatively. In some circumstances, railroad bridge managers may also use Linear Variable Displacement Transducers (LVDTs) or accelerometers to measure bridge displacements. However, LVDT and accelerometer measurements are expensive, and at times not even feasible. Both LVDTs and accelerometers are contact devices, and their installation involves large amount of labor-intensive tasks at difficult to access locations.

It will be appreciated that, like railroad bridges, other structures may also benefit from occasional displacement measurements. For example, road bridges may be beneficially measured for similar reasons as rail bridges. Buildings, antennas, dams, and other structures may be beneficially measured during seismic events, or other events such as floods, extreme heat or cold, or high winds. For at least these reasons, there is a need for robust, flexible, effective, low cost, and easily deployed technologies for structural displacement measurement.

SUMMARY

Systems and methods for structural displacement measurement using unmanned aerial vehicles (UAVs) equipped with lasers are disclosed. Some example methods may include flying a UAV equipped with a laser generator proximal to a structure; directing a laser (generated by the laser generator) at the structure; and receiving reflected laser light. Meanwhile, individual movement of the UAV may be measured with an onboard vehicle motion sensor. Doppler shifts in the reflected laser light may be analyzed in order to calculate relative movement of the UAV and the structure; and the individual movement of the UAV may be subtracted from the relative movement of the UAV and the structure in order to calculate displacement of the structure.

Some example systems to measure displacements of structures may include a UAV equipped with a primary laser Doppler vibrometer and an onboard vehicle motion sensor, and a processing unit. The primary laser Doppler vibrometer may comprise a laser generator, which generates a laser directable at a structure during flight of the UAV, and an optical sensor adapted to receive reflected laser light. The onboard vehicle motion sensor may comprise, e.g., a secondary laser Doppler vibrometer which generates a laser directable at a stationary target, or an accelerometer. The onboard vehicle motion sensor may thereby measure individual movement of the UAV during operation of the primary laser Doppler vibrometer.

The processing unit may be onboard the UAV, or remote from the UAV. The processing unit may be adapted to: analyze Doppler shifts in the reflected laser light in order to calculate relative movement of the UAV and the structure; and subtract the individual movement of the UAV, measured by the onboard vehicle motion sensor, from the relative movement of the UAV and the structure, in order to calculate displacement of the structure. Further aspects and embodiments are described in detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
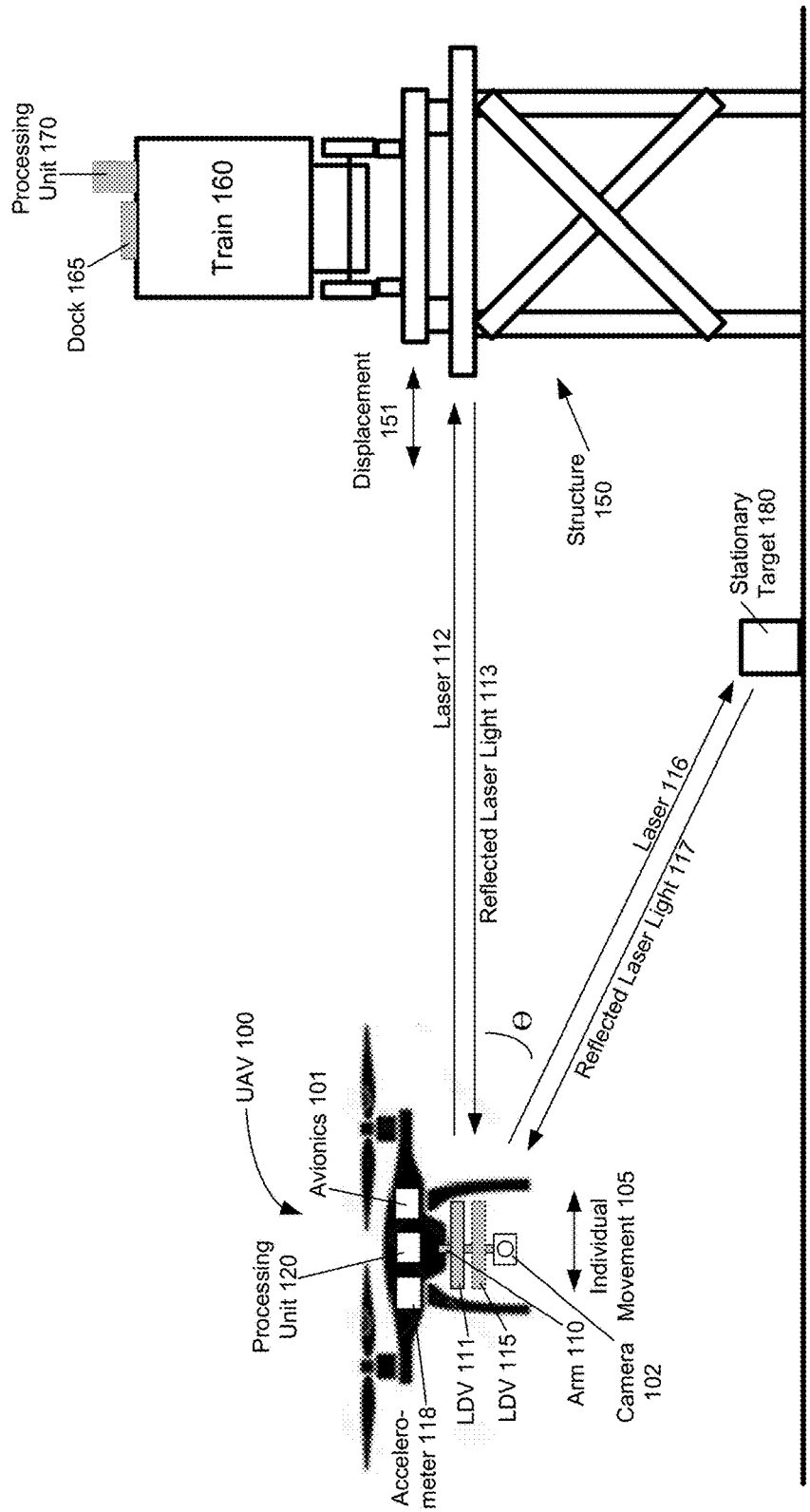
FIG. 1 illustrates an example system to measure displacements of structures.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

In general, one problem in conducting structural displacement measurements using UAVs is that structural displacements tend to be small, and the UAV is itself in motion. Systems and methods according to this disclosure overcome this problem by measuring relative movement of the UAV and the structure, and equipping the UAV with an onboard vehicle motion sensor to measure individual movement of the UAV. The individual movement of the UAV may then be subtracted from the relative movement of the UAV and the structure, in order to accurately calculate structural displacements. A wide variety of additional elements and features are also disclosed.

FIG. 1 illustrates an example system to measure displacements of structures, in accordance with at least some embodiments of the present disclosure. The illustrated system includes a UAV 100 equipped with a laser Doppler vibrometer (LDV) 111 and an onboard vehicle motion sensor. The onboard vehicle motion sensor may be an accelerometer 118 or a second LDV 115. Embodiments including accelerometer 118 need not include second LDV 115, and vice versa. UAV 100 may furthermore include a processing unit 120, avionics 101, and camera 102, along with any number of other elements not illustrated in FIG. 1, such as batteries and other standard elements of UAVs as known to those of skill in the art.

Figure 2:
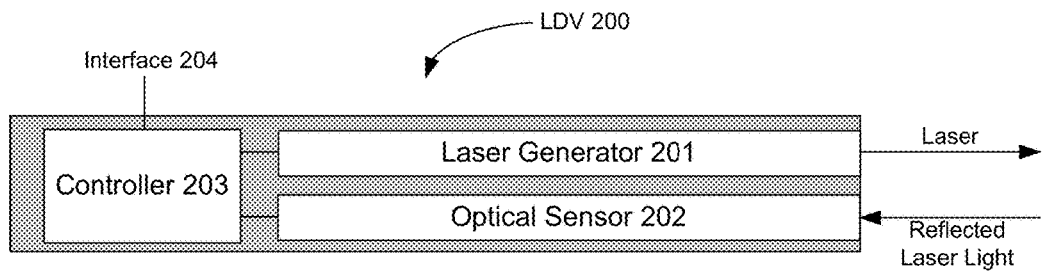
FIG. 2 illustrates an example laser Doppler vibrometer (LDV).

An example LDV, which may serve as LDV 111 and LDV 115, is illustrated in further detail in FIG. 2. In general, LDV 111 may include a laser generator which generates a laser 112 directable at a structure 150 during flight of the UAV 100. LDV 111 may furthermore include an optical sensor adapted to receive, at the UAV 100, reflected laser light 113 which is reflected off of the structure 150. Reflected laser light 113 may optionally be recorded at a memory within LDV 111, or at a memory in processing unit 120. Doppler shifts in the reflected laser light 113 may be analyzed to calculate relative movement of the UAV 100 and the structure 150, as described herein. Relative movement of the UAV 100 and the structure 150 includes both structure displacement 151 and individual movement 105 of the UAV 100.

While FIG. 1 illustrates LDV 111 as an example device for measuring relative movement of the UAV 100 and the structure 150, it will be appreciated that other devices may be used in some embodiments. For example, ultrasound devices, sonar devices, radar devices, lidar devices, video cameras, and/or three dimensional (3D) laser scanning devices may be substituted for LDV 111 in some embodiments.

Similarly, for embodiments employing secondary LDV 115 as an onboard vehicle motion sensor, LDV 115 may include a laser generator which generates a laser 116 directable at a stationary target 180 during flight of the UAV 100. LDV 115 may furthermore include an optical sensor adapted to receive, at the UAV 100, reflected laser light 117 which is reflected off of the stationary target 180. Reflected laser light 117 may optionally be recorded at a memory within LDV 115, or at a memory in processing unit 120. Doppler shifts in the reflected laser light 117 may be analyzed to calculate individual movement 105 of the UAV 100, during operation of the primary LDV 111, as described herein.

For embodiments employing accelerometer 118 as an onboard vehicle motion sensor, accelerometer data may be recorded in order to measure individual movement 105 of the UAV 100 during operation of the primary LDV 111. Accelerometer data may optionally be recorded at a memory within accelerometer 118, or at a memory in processing unit 120. Accelerometer data may be analyzed to calculate individual movement 105 of the UAV 100, during operation of the primary LDV 111, e.g., by calculating displacement of the UAV 100 as a function of accelerations of the UAV 100.

While FIG. 1 illustrates LDV 115 or accelerometer 118 as an example device for measuring individual movement of the UAV 100, it will be appreciated that other devices may be used in some embodiments. For example, ultrasound devices, sonar devices, radar devices, lidar devices, video cameras, and/or three dimensional (3D) laser scanning devices may be substituted for LDV 115 or accelerometer 118 in some embodiments.

Processing unit 120 may include, e.g., a processor adapted to activate and deactivate LDV 111 and onboard vehicle motion sensor 118 or 115. Processing unit 120 may furthermore be adapted to record reflected laser light 113, as may be encoded in a signal received from LDV 111. Processing unit 120 may furthermore be adapted to record reflected laser light 117, as may be encoded in a signal received from LDV 115, or accelerometer data, as may be encoded in a signal received from accelerometer 118.

In some embodiments, processing unit 120 may furthermore include software and/or firmware to process data representations of reflected laser light 113, reflected laser light 117, and/or accelerometer data. However, such processing capability need not necessarily be included in processing unit 120. For example, in some embodiments, such processing capability may instead be included in a remote processing unit, separate from UAV 100, such as in processing unit 170.

In embodiments wherein processing unit 120 includes software and/or firmware to process data representations of reflected laser light 113, reflected laser light 117, and/or accelerometer data, processing unit 120 may analyze Doppler shifts in the reflected laser light 113 in order to calculate relative movement of the UAV 100 and the structure 150. Processing unit 120 may furthermore either analyze Doppler shifts in the reflected laser light 117, or analyze accelerometer data from accelerometer 118, in order to calculate individual movement 105 of the UAV 100. Processing unit 120 may furthermore subtract the individual movement 105 of the UAV 100 from the relative movement of the UAV 100 and the structure 150, in order to calculate at least one displacement 151 of the structure 150.

In some embodiments, the UAV 100 may be adapted to launch from, and return to, a dock 165, e.g., a dock on a train 160 or other vehicle proximal to the structure 150, or a dock on or near the structure 150 itself. The UAV 100 may be deployed from a vehicle 160 crossing the bridge 150 in order to measure displacement of the bridge 150 while the vehicle 160 is crossing the bridge 150. The dock 165 may optionally be adapted to transport the UAV 100, recharge batteries on the UAV 100, and/or secure the UAV 100 from inclement weather or other dangers. In some embodiments, the dock 165 may transmit a wireless signal detectable by UAV 100, e.g., via avionics 101, and UAV 100 may be adapted to use the wireless signal to return to dock 165. In some embodiments, the dock 165 may comprise a wired or wireless data interface allowing dock 165 to send and receive data to and from UAV 100, e.g., dock 165 may send UAV 100 an activation signal instructing UAV 100 to launch and perform measurements, and dock 165 may receive from UAV 100 data representations of reflected laser light 113, reflected laser light 117, and/or accelerometer data, and/or displacement measurements resulting from processing such data at UAV 100.

In some embodiments, the dock 165 may comprise or be coupled with processing unit 170. Alternatively or additionally, dock 165 may be equipped with a wired or wireless network connection which may allow dock 165 to transmit data retrieved from UAV 100 a remote server for further processing. Processing unit 170 or a remote server may be adapted to process data representations of reflected laser light 113, reflected laser light 117, and/or accelerometer data, as described above in connection with processing unit 120. For example, processing unit 170 may analyze Doppler shifts in the reflected laser light 113 in order to calculate relative movement of the UAV 100 and the structure 150; analyze Doppler shifts in the reflected laser light 117, or analyze accelerometer data from accelerometer 118, in order to calculate individual movement 105 of the UAV 100; and/or subtract the individual movement 105 of the UAV 100 from the relative movement of the UAV 100 and the structure 150, in order to calculate at least one displacement 151 of the structure 150.

In some embodiments, the UAV 100 may be adapted to use camera 102 and avionics 101 to orient itself for measuring displacement 151 of structure 150. Camera 102 may comprise a visual light camera, or for example, a 3D laser scanner or other device. Avionics 101 may comprise image processing software adapted to recognize structure 150 in images from camera 102, and avionics 101 may auto-navigate UAV 100 to a desired location to perform a measurement. In some embodiments, avionics 101 may comprise a stored three dimensional (3D) model of structure 150 and/or the surrounding landscape, for use in image matching to navigate UAV 100, position UAV 100, and direct laser 112. Avionics 101 may also comprise a Global Positioning System (GPS) or other positioning electronics. When UAV 100 is navigated to the desired position, avionics 101 may optionally activate arm 110 to rotate and/or tilt LDV 111 and LDV 115, in order to direct lasers 112 and 116 at structure 150 and stationary target 180, respectively. Avionics 101 may then activate processing unit 120, LDV 111, LDV 115, and/or accelerometer 118, at a desired activation time, in order to perform the desired measurement. Avionics 101 may then return UAV 100 to a desired return location such as dock 165.

In some embodiments, the UAV 100 may alternatively be operated by a human operator via remote control, and the human operator may navigate UAV 100 to the desired location; orient LDV 111 and LDV 115; activate processing unit 120, LDV 111, LDV 115, and/or accelerometer 118, at a desired activation time, in order to perform the desired measurement; and return UAV 100 to a desired return location.

Displacements of structure 150 and UAV 100 may have vertical, lateral, and transverse components. Vertical components are up/down displacements, lateral displacements are left/right displacements, and transverse displacements are forward/backward displacements. For railway bridges, the displacement of interest is generally the transverse displacement, from the perspective of UAV 100 in FIG. 1. Therefore in some embodiments, processing unit 120 or 170 may be adapted to isolate transverse displacements, and calculate only transverse displacement 151 of structure 150. Of course, other displacements may be isolated for other structure types as appropriate.

In FIG. 1, laser 112 is directed normal to structure 150, and therefore the resulting displacement measurement may include only transverse displacement information, with no need to separate other displacement components. However, when a laser is directed at an angle θ, such as laser 116, the resulting measurement may include multiple components, which may be separated by processing unit 120 or 170 using the laser angle θ, the measured displacement, and the trigonometric functions sine, cosine, or tangent, as appropriate.

In some embodiments, displacement measurement outputs produced according to this disclosure may take the form of a graph of displacement over time, or otherwise, as data showing displacement over time. For example, a structural vibration, such as produced in a rail road bridge when a train crosses, may be illustrated by a graph showing displacement as a function of time during the train crossing. Systems according to this disclosure may be adapted to engage the LDV 111 and the onboard vehicle motion sensor 115 or 118 during a structure stress event, such as a train crossing, and to measure displacements 151 and 105 throughout the stress event. Measurements by LDV 111 and the onboard vehicle motion sensor 115 or 118 may be synchronized or otherwise associated with clock times, and the processing unit 120 or 170 may be configured to subtract individual movement from relative movement for each time value within the stress event or other measurement period.

While structure 150 is illustrated as a rail bridge, it will be appreciated that other structures may also be measured using the technologies disclosed herein. For example, structures may include road bridges, buildings, antennas, dams, or other structures as will be appreciated. Furthermore, stress events of interest may include train crossings, as illustrated in FIG. 1, as well as large truck or other vehicle crossings of road bridges, seismic events, floods (whether river floods or otherwise), extreme heat or cold, high winds, explosions, or other events.

In some embodiments, the system illustrated in FIG. 1 may be adapted to measure displacements of multiple different bridges in a transportation network, in order to prioritize repair of the multiple different bridges in the transportation network. For example, each time the train 160 crosses a bridge, the UAV 100 may launch and measure displacement of the bridge. The measurement data from multiple bridges may be aggregated and bridge repair or replacement may be prioritized at least partly in order of which bridges exhibit the largest displacements. In some embodiments, displacement measurements may be used to build and/or update fragility curves, as described herein.

In some embodiments, the system illustrated in FIG. 1 may be adapted to measure displacement of the structure 150 multiple times, during multiple different structure stress events at the structure 150, e.g., during multiple different train crossings, in order to monitor the structure 150 over the multiple different structure stress events. Differences in displacement over multiple measurements in a monitoring campaign may be used to prioritize repair or maintenance. For example, sharp increases in measured displacements of a structure may present a concern warranting human inspection, or immediate repair.

FIG. 2 illustrates an example laser Doppler vibrometer (LDV), in accordance with at least some embodiments of the present disclosure. An LDV such as LDV 200 may be used for either or both of LDV 111 and LDV 115 in some embodiments. LDV 200 includes a laser generator 201, an optical sensor 202, a controller 203, and an interface 204. Controller 203 may activate and deactivate laser generator 201 to generate a laser output, as shown. Optical sensor 202 may receive reflected laser light, as shown, and controller 203 may record reflected laser light signal information. Controller 204 may optionally receive laser activation/deactivation commands via interface 204, e.g., from an external processing unit 120, and controller 204 may activate and deactivate laser generator 201 responsive to received commands. Controller 204 may also optionally output reflected laser light signal information via interface 204, e.g., to provide reflected laser light signal information to processing unit 120 for recording and/or further processing.

Figure 3:
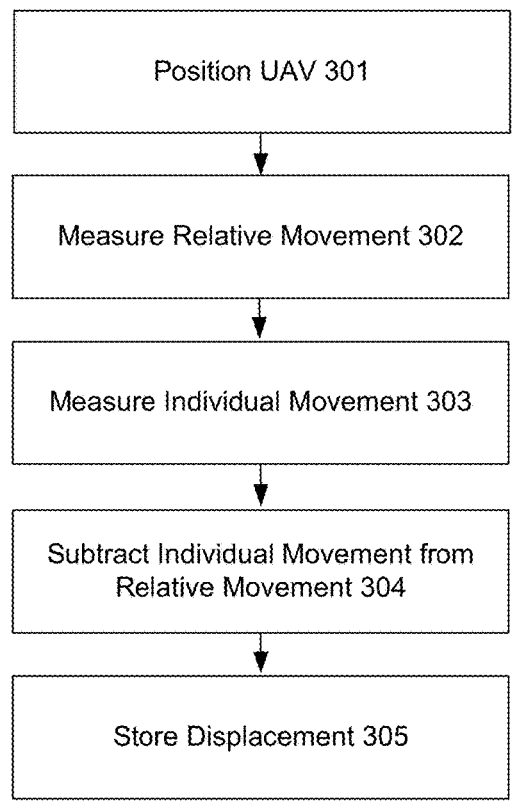
FIG. 3 illustrates an example method to measure displacements of structures using UAVs equipped with laser generators.

FIG. 3 illustrates an example method to measure displacements of structures using UAVs equipped with laser generators, in accordance with at least some embodiments of the present disclosure. The illustrated operations may be performed in sequence as shown, or the illustrated operations may be re-ordered, combined, split into multiple operations, and/or performed simultaneously in some embodiments. The operations include: Position UAV 301, Measure Relative Movement 302, Measure Individual Movement 303, Subtract Individual Movement from Relative Movement 304, and Store Displacement 305.

The Position UAV 301 operation may comprise, for example, flying a UAV 100 equipped with a laser generator, such as LDV 111, proximal to a structure 150. Operation 301 may be followed by operations 302 and 303.

The Measure Relative Movement 302 operation may comprise, for example, during said flying the UAV 100, directing a laser 112 generated by the LDV 111 at the structure 150, and receiving, at the UAV 100, reflected laser light 113 which is reflected off of the structure 150. Doppler shifts in the reflected laser light 113 may be analyzed in order to calculate relative movement of the UAV 100 and the structure 150. While the use of lasers is described in detail herein, other approaches to measure relative movement may be feasible in some embodiments. For example, capturing a video of a structure during a stress event, and performing image analysis on the video, may allow for extraction of displacement data in some embodiments. Operation 302 may be performed simultaneously with 303.

The Measure Individual Movement 303 operation may comprise, for example, while receiving reflected laser light 113 pursuant to operation 302, measuring individual movement 105 of the UAV 100 with an onboard vehicle motion sensor. If the onboard vehicle motion sensor comprises a secondary LDV 115, measuring individual movement 105 of the UAV 100 may comprise directing a laser 116 generated by the LDV 115 at a stationary target 180, and receiving, at the UAV 100, reflected laser light 117 which is reflected off of the stationary target 180. Doppler shifts in the reflected laser light 117 may be analyzed in order to calculate individual movement 105 of the UAV 100. If the onboard vehicle motion sensor comprises an accelerometer 118, measuring individual movement 105 of the UAV 100 may comprise activating accelerometer 118 to record accelerometer data at the UAV 100. The accelerometer data may be analyzed in order to calculate individual movement 105 of the UAV 100. Operations 302 and 303 may be followed by operation 304

The Subtract Individual Movement from Relative Movement 304 operation may comprise, for example, subtracting at least one component of the individual movement 105 of the UAV 100, measured by the onboard vehicle motion sensor, from at least one component of the relative movement of the UAV 100 and the structure 150, in order to calculate at least one displacement 151 of the structure 150. Operation 304 may be followed by operation 305.

The Store Displacement 305 operation may comprise, for example, storing output of the subtraction operation at block 304 in a computer memory. The output may be stored, for example, as displacement data and/or as a function of displacement over time.

Figure 4:
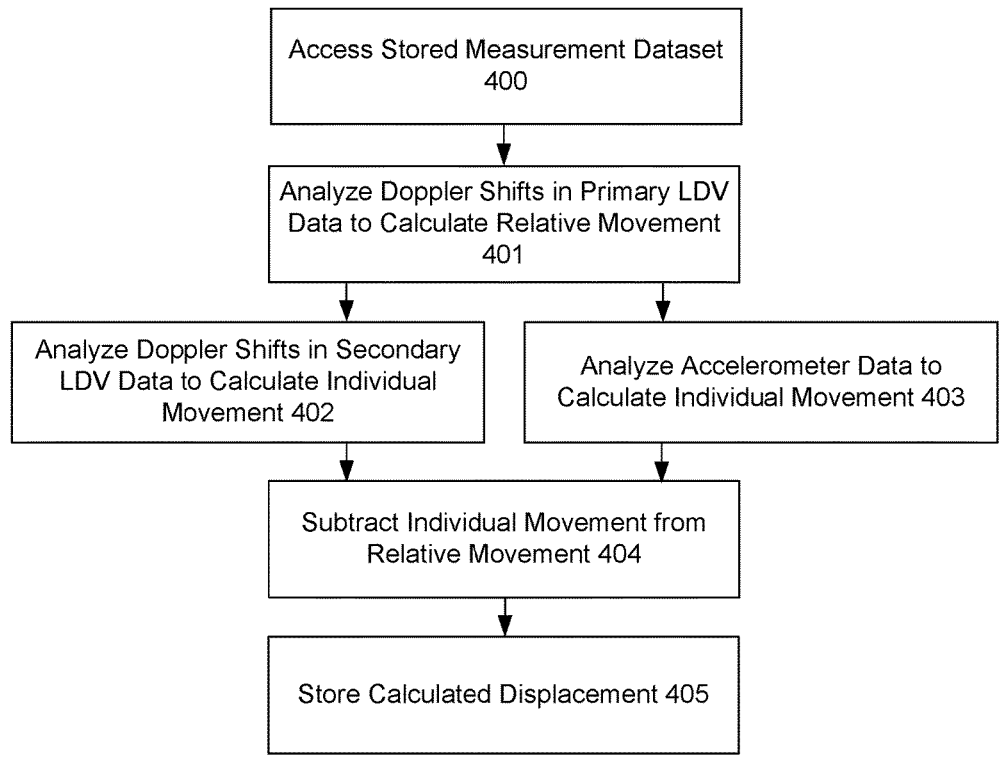
FIG. 4 illustrates isolated data processing aspects of the method of FIG. 3.

FIG. 4 illustrates isolated data processing aspects of the method of FIG. 3, in accordance with at least some embodiments of the present disclosure. The illustrated operations may be performed in sequence as shown, or the illustrated operations may be re-ordered, combined, split into multiple operations, and/or performed simultaneously in some embodiments. The operations include: Access Stored Measurement Dataset 400, Analyze Doppler Shifts in Primary LDV Data to Calculate Relative Movement 401, Analyze Doppler Shifts in Secondary LDV Data to Calculate Individual Movement 402, Analyze Accelerometer Data to Calculate Individual Movement 403, Subtract Individual Movement from Relative Movement 404, and Store Calculated Displacement 405.

In some embodiments, the data analysis and processing operations associated with FIG. 3 may be performed after measurement data is gathered and stored by UAV 100. FIG. 4 represents operations which may be performed, e.g., by a computing device 170 after measurement data is collected, in order to complete the data analysis and processing operations. Computing device 170 may comprise computer executable instructions which cause a processor to carry out the operations illustrated in FIG. 4.

The Access Stored Measurement Dataset 400 operation may comprise, for example, loading measurement data into computing device memory for analysis. The measurement data may comprise, e.g., a set of data files corresponding to a particular measurement operation by UAV 100. Operation 400 may be followed by operation 401.

The Analyze Doppler Shifts in Primary LDV Data to Calculate Relative Movement 401 operation may comprise, for example, correlating Doppler shifts in primary LDV data to movement speed information. The correlated movement speed may then be integrated to calculate total relative displacement as a function of time. If there are separable vertical, lateral, or transverse relative displacement components, these components may be separated using trigonometric functions and laser angle, as described herein. Operation 401 may be followed by operation 402 or operation 403.

The Analyze Doppler Shifts in Secondary LDV Data to Calculate Individual Movement 402 operation may comprise, for example, correlating Doppler shifts in secondary LDV data to movement speed information. The correlated movement speed may then be integrated to calculate total individual displacement as a function of time. If there are separable vertical, lateral, or transverse individual displacement components, the components may be separated using trigonometric functions and laser angle, as described herein. Operation 403 may be performed as an alternative to operation 402.

The Analyze Accelerometer Data to Calculate Individual Movement 403 operation may comprise, for example, integrating acceleration data to calculate movement speed information, and integrating movement speed information to total individual displacement as a function of time. If there are separable vertical, lateral, or transverse individual displacement components, the components may be separated using trigonometric functions and laser angle, as described herein. Operation 402 or 403 may followed by operation 405.

The Subtract Individual Movement from Relative Movement 404 operation may comprise, for example, subtracting at least one component of the individual movement 105 of the UAV 100, measured by the onboard vehicle motion sensor and calculated at block 402 or 403, from at least one component of the relative movement of the UAV 100 and the structure 150, calculated at block 401, in order to calculate at least one displacement 151 of the structure 150. In some embodiments, the subtraction operation may be performed by subtracting the function of individual displacement with respect to time, from the function of relative displacement as a function of time, to calculate a function of structural displacement over a function of time, for the time window of the measurement performed by UAV 100. Operation 404 may be followed by operation 405.

The Store Calculated Displacement 405 operation may comprise, for example, storing output of the subtraction operation at block 404 in a computer memory, as described above in connection with FIG. 3. The output may be stored, for example, as displacement data and/or as a function of displacement over time.

In some embodiments, this disclosure provides cost-effective means to assess the condition of railroad bridges using reference-free estimates (that is, estimates which do not require a calibration reference) of bridge displacement under revenue service train loads and natural hazards (e.g. flash floods) using UAVs and laser generators. The disclosed system may be initially deployed for monitoring of railroad bridges of higher interest/need of condition assessment at environmentally affected areas and enabling engineering for natural hazards (ENH). In addition, to enable and validate measurements such as displacements via no-contact remote sensing, the disclosed technologies may provide a use for the data obtained, namely, quantitative information about bridges at the network level. Estimated displacements may be used to determine service limit states that railroads can adopt to prioritize bridge repairs at the network level. To inform railroads about the resilience of their bridges using this relation between bridge displacements and bridge conditions, fragility curves may be employed, which relate the bridge condition (or service level) to the bridge displacements. Therefore in some embodiments, displacement data collected using the systems and methods described herein may be used to build fragility curves for bridges in a transportation network.

Bridge inspection reports inform maintenance, repair, and replacement (MRR) decisions for transportation networks. Railroad bridge inspections are annually required since 2010 as part of the bridge management program, and in order to follow the American Railway Engineering and Maintenance-of-Way Association (AREMA) recommended practices. Railroad bridge inspections take time and cost money. In addition, three significant challenges affect railroad bridge inspections today: (1) railroad bridge inspectors need to evaluate visually all of the bridge structural elements. This is a major challenge in tall and long steel bridges where elements are difficult to access. At times, inspections need to be scheduled in between regular traffic to allow visual access of inspectors to bridge elements, reducing traffic capacity; (2) visual observations without measurements can't quantify defects, they are in general subjective and depend on the inspector carrying them; and (3) current inspections cannot quantify the dynamic response of bridges to railroad crossing events, even though the railroad community is interested in measuring the performance of railroad bridges under live loads.

This disclosure overcomes these challenges by using UAVs with laser generators to measure bridge condition. Furthermore, while documenting conditions can be valuable, the ability to rescan and automatically check for differences between monitoring campaigns may be even more valuable.

Structural vulnerability may be expressed using fragility curves. Fragility curves provide the probability of structural failure at a particular performance level under a certain intensity of loading. Development of fragility curves utilizes a set of data indicating structural performance under applied loading with different intensity levels. The data set may include information about both damaged and non-damaged conditions. Such damage (and non-damage) data can be acquired from real-time observation of structural performance and/or by comparing loading demand with structural capacity obtained through numerical simulations.

Figure 5:
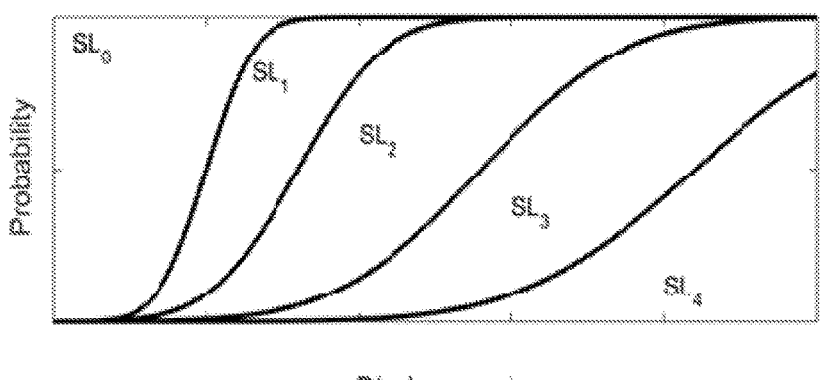
FIG. 5 provides example bridge fragility curves.

Several studies have been performed to evaluate bridge fragility characteristics under extreme loading scenarios. In seismic vulnerability assessments of bridges, fragility curves were developed through (i) numerical simulation of dynamic behavior of bridges under seismic motions and (ii) statistical analysis of bridge damage data obtained from real life hazard scenarios. FIG. 5 provides example bridge fragility curves. Analytical fragility curves of bridges are developed based on bridge performance obtained from numerical analyses under different loading scenarios. Empirical fragility curves are also developed based on statistical analysis of bridge damage data observed during previous real-time events. In this process, observed damage data is categorized based on various physical parameters (e.g., structural attributes, configurations, year built, material type, and soil type) and fragility curves are developed for each category. Fragility curves for a particular category represent fragility characteristics of each and every bridge in that category. This is based on the assumption that bridges within a category will exhibit similar behavior.

In most previous studies, fragility curves are described as monotonically increasing functions that represent the probability of bridge failure for different performance levels under a certain intensity of loading. Traditionally, a two-parameter lognormal distribution function is used to define a fragility curve. The distribution parameters, referred to as fragility parameters, are median c and log-standard deviation $\zeta$. At a bridge damage state k (=minor, moderate and major), the analytical form of the fragility function is expressed as $$F(I_j, c_k, \zeta_k) = \Phi\left[\frac{\ln(I_j/c_k)}{\zeta_k}\right] \quad [1]$$

where $I_j$ represents intensity of an extreme event j. Fragility parameters $c_k$ and $\zeta_k$ for the damage state k can be estimated using maximum likelihood method. The likelihood function L is given as $$L = \prod_{j=1}^{M} [F(I_j, c_k, \zeta_k)]^{r_j}[1 - F(I_j, c_k, \zeta_k)]^{(1-r_j)} \quad [2]$$

where $r_j=0$ or 1 depending on whether or not the bridge sustains the damage state k under jth event. M represents the total number of loading scenarios used to generate fragility curves. For seismic fragility curves, peak ground acceleration (PGA) and peak ground velocity (PGV) are the commonly used intensity measures (I) of seismic ground motions. In a similar fashion, displacements collected using UAVs with lasers under train crossings can be used as intensity measure for generating bridge fragility curves of service limit states under different flood levels.

Structural health monitoring of civil infrastructure, specifically bridges, has made significant progress during the last two decades. Many methods have been suggested for monitoring dynamic response of bridges under different types of loading using sensor networks. Several methods of data analysis were also developed for damage feature extraction in the time domain, frequency domain and wavelet domain. Methods were also developed for patterning damage features and recognizing the structural health state using damage pattern recognition techniques. Many of these methods considered aleatoric uncertainty (randomness) in monitoring data and other methods considered aleatoric and epistemic uncertainties in the damage recognition process.

SHM systems have been successfully used to establish fragility curves for different types of structures. Most of current SHM systems measure dynamic response using accelerometers and strain gauges. A few systems are based on displacement monitoring using linear variable differential transducers (LVDT), or by integrating acceleration measurements. Embodiments of this disclosure may use displacement measurements as described herein to build fragility curves according to any known approach, or according to approaches as may be developed in the art.

In some embodiments, the systems and method described herein may incorporate 3D laser scanning technologies. 3D laser scanning may be used as an efficient structural monitoring method. The ability of the 3D laser scanning to develop 3D geometric models of the structure and to realize changes in structural conditions make it a very attractive tool for SHM. Multiple researchers have explored the use of 3D reconstruction using UAVs, but their emphasis has been built structures and morphology, and not the response under live load, which is the parameter of interest describing bridge health in this disclosure. The ability of 3D laser scanning to measure displacements without needing a reference point make it a very attractive tool to evaluate railroad bridges displacements. Therefore, some embodiments of this disclosure may include 3D laser scanning to establish computational models that quantify the structural condition of structures.

One application of this disclosure is the use of UAVs with lasers for inspection of railroad bridges including displacements under revenue service traffic and changing environmental conditions. This technology may be integrated with existing modeling and simulation tools to facilitate the necessary coupling between sensing and structural analysis for prediction of failure and assessment of resilience, employing a hybrid approach that combines both sensing, modeling, and prediction of dynamic responses. Current maintenance, repair, and replacement (MRR) decisions are informed by bridge inspections and ratings, which recommend observing the response of bridges under trains. There is value in obtaining reference-free displacements using wireless smart sensors, with good approximations between the measured displacements using conventional references and the estimated displacements.

Another application of this disclosure may include integrating both the bridge performance (displacement) and bridge condition (inspection) remotely, specifically in environmentally affected areas when high water level exists or when the bridges cannot be accessed and railroads want to assess the bridge condition. The baselines collected in the first inspection provide a base of performance (reference, or threshold) that can be input in a model of the bridge. The relations between bridge condition and performance may be validated with a hybrid approach in the laboratory before and after a field campaign. New measurements using UAVs with enough details provided by laser scanning technology may allow updates to this model and may thus enable predicting bridge condition at the network level.

Inspection methods disclosed herein provide information about the condition and performance of bridges from every inspection, thus allowing for automatic creation of a base line for each bridge (both condition and performance) and for comparison for different environment conditions (rain, temperature). This information allows railroads to (1) predict future condition and performance of a given bridge inputting the data for a bridge model; and (2) collect a pool of parameters of bridges responses to create fragility curves relating the condition of the bridge with the level of service to traffic and "flood index" at the network level (performance).

Fragility curves may be employed to correlate bridge service condition to bridge displacements under revenue service traffic. Fragility curves are a statistical tool representing the probability of exceeding a given performance (or damage) state as a function of an engineering demand parameter. Collecting data from the bridges of interest (both condition and performance), service limit-states (SL) represent the consequences to rail operations associated with bridge displacement. Freight trains can be conservatively assumed to have the same weight. The SL of this framework are described by railroads experts based on standard railroad bridge management decisions and related to their effect to railroad operations. Measuring both bridges condition and displacements under traffic provide objective information about the service limit-state of the bridge. Fragility curves for a particular railroad bridge $SL_k$ are obtained by computing the conditional probabilities of a given $SL_k$ being exceeded. FIG. 5 shows one example of fragility curves of all $SL_k$.

In this disclosure, the fragility functions $F_{k,j}(d)$ may be defined as the probability of being in service limit-state $SL \leq k$, given that the maximum displacement of the bridge is d, i.e., $$F_{k,j}(d)=P(SL_k) \quad [3]$$

where
D=random variable representing the maximum measured displacement of the bridge under revenue traffic,
d=realization of the random variable D,
$SL_k$=service limit-state, with k=0, 1, 2, 3, 4

In summary, this disclosure provides equipment and analysis methods including means to collect both the bridge condition and performance information at the site that can be used to inform structural assessment in both the modeled structure or the network of bridges of similar design but different condition (rain, temperature changes), and performance (service limit state). Critical to the framework is the ability to assess bridge service condition. Railroads can collect objective performance information of the bridge service condition under revenue service traffic and water level using UAVs and laser scanning technologies. The laser scanning technology enables realistic finite element models that reflect baseline structure and changes in it. Fragility curves relate the measured bridge performance with a service limit state. Using this approach, the railroad management agency can prioritize decisions on maintenance and/or upgrade of their railroad bridge networks.

Recent developments of UAVs provide embodiments of this disclosure with available developed tools which can be applied in the context of railroad bridge inspections. The quality of the control and the images recorded have rapidly increased while the costs have dropped. Optional features include autonomous and pre-programmable flights. The use of 3D laser scanning for bridge condition assessment enables creating 3D virtual models that represent in-situ bridge conditions and can assist to assess changes in bridge health over time. Creating 3D virtual models may involve three main steps: Laser Scan Data Collection, Scan Registration, and 3D Modeling. Data collection may include scanner placement on a tripod at multiple locations around the structure. Multiple positions may reduce shadow zones and provide overlapping scans to assist with Scan Registration. During data collection, targets may be placed over control points to allow for repeatable survey ties and georectification of the data. The Data Registration process may involve tying multiple scan positions together to create a combined point cloud. Point clouds may be analyzed by the registration software to find overlapping data and a best-fit orientation. The targets collected by the scanner along with GPS or other survey methods may provide a calibration to a local or global coordinate system. Finally, 3D modeling process may involve utilizing point clouds to create 3D solids or 3D surface meshes that represent actual conditions. 3D modeling of point cloud data can be performed in a variety of CAD/GIS platforms including AUTODESK® and BENTLEY®. Point clouds are easily imported into inspection using reverse engineering algorithms to create CAD. This data can then be used to create finite element model representing the bridge. Integrating data collected from 3D laser scanning cameras installed on a mobile UAV subjected to environmental conditions (specifically wind) is a challenging task and may incorporate innovative solutions and algorithms in the fields of control theory, positioning systems and digital signal processing, and 3D laser scanning.

One interesting aspect of this disclosure stems from the ability of 3D laser scanning to provide high resolution images that provide detailed information and reflect critical aspects in the railway bridge. For instance, 3D laser scanning images may provide information about missing or deformed elements, missing bolts in a joint, cracked joint, cracks in super and/or substructures, water uptake by concrete elements, deformed bearings, etc. The ability to develop finite element models using 3D laser scanning data allows reflecting all this plethora of information into quantifiable structural models that can provide realistic and objective assessment of railway bridges and can be extended for efficient structural prognosis.

One goal of the disclosed technology may be to inform the railroad owner about the condition of the bridge for decision-making. The disclosed integrated technology may be used for structural monitoring and assessment of railway bridges. Finally, the use of 3D laser scanning allows overcoming a challenge typical UAVs with 2D images would face. This challenge pertains to the range of imaging of the UAV. The ability of 3D laser scanning technology to provide a fly-through like data of the bridge by integrating the different scanned frames is another advantage the integration of UAV and 3D laser scanning technologies may make possible. With the new access of monitored data from different inspections, and by comparing the digital data collected in between flights, now the bridge inspectors and managers can make decisions based on objective data that has been collected from the UAV 3D laser scans. The new approach overcomes the current limitations accessing the bridge and the inability of collecting displacements because of the lack of references.

Technologies according to this disclosure may have a significant impact facilitating monitoring and assessment of railroad bridges within the network to achieve safe, efficient, and effective management policies in the US. Because there is one railroad bridge per 1.4 miles of track, the results of this disclosure will benefit railroad operations and budgets as a whole. Specific expected outcomes include, but are not limited to improving awareness of application of new technology for industry safety and resilience assessment and establishing relationships between this novel displacement measurement, existing track geometry measurements and methods, and bridge and track condition, as well as their relationship; identifying current research needs for railroad bridge campaign monitoring technological development for their application by the industry in their day-to-day operations; and providing basis to increase capacity of railroad networks while reducing expenses based on the understanding of railroad bridge performance.

The invention claimed is:

1. A method to measure displacements of structures using unmanned aerial vehicles (UAVs) equipped with laser generators, the method comprising:
   flying a UAV equipped with a laser generator proximal to a structure;
   during said flying the UAV, directing a laser generated by the laser generator at the structure;
   during said flying the UAV, receiving, at the UAV, reflected laser light which is reflected off of the structure;
   during said receiving reflected laser light, measuring individual movement of the UAV with an onboard vehicle motion sensor;
   analyzing Doppler shifts in the reflected laser light in order to calculate relative movement of the UAV and the structure; and
   subtracting at least one component of the individual movement of the UAV, measured by the onboard vehicle motion sensor, from at least one component of the relative movement of the UAV and the structure, in order to calculate at least one displacement of the structure.

2. The method according to claim 1, wherein at least the receiving reflected laser light and the measuring individual movement of the UAV are performed during a structure stress event.

3. The method according to claim 2, wherein the structure is a bridge, and the structure stress event comprises a vehicle crossing the bridge.

4. The method according to claim 2, wherein the structure is a bridge, and the structure stress event comprises a river flood.

5. The method according to claim 2, wherein the structure is a railroad bridge, and the structure stress event comprises a train crossing the railroad bridge.

6. The method according to claim 2, wherein the structure is a building, and the structure stress event comprises a seismic event.

7. The method according to claim 1, wherein the structure is a bridge, and further comprising performing the method multiple times for multiple different bridges in a transportation network, in order to prioritize repair of the multiple different bridges in the transportation network.

8. The method according to claim 1, wherein the structure is a bridge, and further comprising deploying the UAV from a vehicle crossing the bridge in order to measure displacement of the bridge while the vehicle is crossing the bridge.

9. The method according to claim 1, further comprising performing the method multiple times, during multiple different structure stress events at the structure, in order to monitor the structure over the multiple different structure stress events.

10. The method according to claim 1, wherein the onboard vehicle motion sensor comprises either a second laser generator that generates a second laser directed at a stationary target, or an accelerometer.

11. The method according to claim 1, wherein the at least one displacement of the structure is only a transverse displacement of the structure.

12. A system to measure displacements of structures, the system comprising:

an unmanned aerial vehicle (UAV) equipped with at least one laser Doppler vibrometer and an onboard vehicle motion sensor;

wherein the laser Doppler vibrometer comprises:

a laser generator that generates a laser directable at a structure during flight of the UAV; and an optical sensor adapted to receive, at the UAV, reflected laser light which is reflected off of the structure;

wherein the onboard vehicle motion sensor is adapted to measure individual movement of the UAV during operation of the laser Doppler vibrometer;

a processing unit adapted to:

analyze Doppler shifts in the reflected laser light in order to calculate relative movement of the UAV and the structure; and subtract at least one component of the individual movement of the UAV, measured by the onboard vehicle motion sensor, from at least one component of the relative movement of the UAV and the structure, in order to calculate at least one displacement of the structure.

13. The system according to claim 12, wherein the system is adapted to engage the laser Doppler vibrometer and the onboard vehicle motion sensor during a structure stress event.

14. The system according to claim 13, wherein the structure is a bridge, and the structure stress event comprises a vehicle crossing the bridge or a river flood.

15. The system according to claim 13, wherein the structure is a railroad bridge, and the structure stress event comprises a train crossing the railroad bridge.

16. The system according to claim 12, wherein the structure is a bridge, and wherein the system is adapted to measure displacements of multiple different bridges in a transportation network, in order to prioritize repair of the multiple different bridges in the transportation network.

17. The system according to claim 12, wherein the structure is a bridge, and wherein the UAV is deployed from a vehicle crossing the bridge in order to measure displacement of the bridge while the vehicle is crossing the bridge.

18. The system according to claim 12, wherein the system is adapted to measure displacement of the structure multiple times, during multiple different structure stress events at the structure, in order to monitor the structure over the multiple different structure stress events.

19. The system according to claim 12, wherein the onboard vehicle motion sensor comprises either a second laser Doppler vibrometer that generates a laser directable at a stationary target, or an accelerometer.

20. The system according to claim 12, wherein the at least one displacement of the structure is only a transverse displacement of the structure.

* * * * *